(12) United States Patent
Lombardi et al.

(10) Patent No.: US 8,224,405 B2
(45) Date of Patent: Jul. 17, 2012

(54) IMPLEMENTATION OF FRICTION HINGE WITH A RANGE OF MOTION AND DETENT SEPARATION GREATER THAN 180 DEGREES

(75) Inventors: Michael J Lombardi, Mundelein, IL (US); Roger W. Harmon, Crystal Lake, IL (US); Srikanth Thiruppukuzhi, Vernon Hills, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 610 days.

(21) Appl. No.: 12/338,239

(22) Filed: Dec. 18, 2008

(65) Prior Publication Data

US 2010/0154171 A1   Jun. 24, 2010

(51) Int. Cl.
*H04B 1/38*   (2006.01)
*E05D 11/08*  (2006.01)
*G06F 1/16*   (2006.01)

(52) U.S. Cl. .... 455/575.3; 16/341; 16/337; 361/679.55; 361/679.56

(58) Field of Classification Search ............... 455/575.3; 16/341, 337; 361/679.55, 679.56
See application file for complete search history.

(56) References Cited

U.S. PATENT DOCUMENTS

| | | | |
|---|---|---|---|
| 5,628,089 A | 5/1997 | Wilcox et al. | |
| 6,065,187 A | 5/2000 | Mischenko | |
| 6,530,121 B2 | 3/2003 | Hayashi | |
| 6,745,436 B2 | 6/2004 | Kim | |
| 7,111,361 B2 | 9/2006 | Li et al. | |
| 2004/0137970 A1* | 7/2004 | Han | 455/575.3 |
| 2005/0239520 A1* | 10/2005 | Stefansen | 455/575.1 |
| 2006/0005353 A1 | 1/2006 | Kubota | |
| 2006/0007648 A1 | 1/2006 | Wang | |
| 2007/0011847 A1 | 1/2007 | Luo | |
| 2009/0244832 A1* | 10/2009 | Behar et al. | 361/679.55 |

* cited by examiner

*Primary Examiner* — Ariel Balaoing (57) ABSTRACT

A mobile phone or other electronic device is provided with an improved friction hinge with a radial range of motion greater than 180 degrees and with detents at both ends of travel. The friction hinge can include an asymmetrical cam in conjunction with a single tab on a follower. Advantageously, the electronic device with the improved friction hinge can allows a full 360 degree range of motion with any number of detents at any radial position.

15 Claims, 5 Drawing Sheets

IMPLEMENTATION OF FRICTION HINGE WITH A RANGE OF MOTION AND DETENT SEPARATION GREATER THAN 180 DEGREES

BACKGROUND OF THE INVENTION

1. Field of the Disclosure

The disclosure relates in general to friction hinges for electronic devices, and more particularly, to friction hinges for electronic devices having a clamshell configuration. The electronic devices can include an electronic display and a keyboard on opposing outward surfaces of the clamshell configuration. In certain embodiments, the clamshell configuration comprises a mobile telephone, but the disclosure is not limited to mobile telephones.

2. Background Art

There is a need for a cylindrical cam-style friction hinge with a 190 degree range of motion and detents at both ends of travel in an electronic device. The structural components and parts in conventional electronic devices do not satisfy these requirements due to the symmetrical design of both the cam and follower. The present approach to hinge design allows for detents at any radial position from 0 degrees to 180 degrees, but not over 180 degrees.

Electronic devices, such as mobile telephones and the like, include a number of different configurations. A clamshell configuration which includes two components that are hinged together at one side edge is a common type of configuration for electronic devices. Typically, the inner surfaces house an electronic display and a keyboard such that the electronic device must be pivoted or rotated to view and access the electronic display and keyboard.

Over the years various electronic devices have been suggested that operate with various degrees of success. Many conventional friction hinges in electronic devices have numerous complex structural parts and components which can be expensive and are not always reliable. They can be difficult to manufacture, maintain and repair and are not user friendly. They also sometimes fail to function in their intended manner.

It is, therefore, desirable to provide for an electronic device with an improved friction hinge which overcomes most, if not all, of the preceding problems.

SUMMARY OF THE INVENTION

An electronic device with an improved friction hinge is provided that is user-friendly, reliable, and effective. The novel electronic device is simple to use, easy to manufacture and can be readily maintained and repaired, if necessary. The electronic device can be an electronic device with a clamshell configuration, a radiotelephone, a cellular (cell) phone, a mobile phone, smartphone, qwerty flip device, wireless device, portable gaming device, mobile communications device, personal digital assistant (PDA), wireless e-mail device, a two way pager, or other hand held electronic device.

The disclosure is directed to an electronic device with a friction hinge with a radial range of motion greater than 180 degrees and with detents at both ends of travel. This can be achieved through the use of an asymmetrical cam in conjunction with a single tab on a follower. The new design exceeds the functionality achieved in industry by a symmetric cam and dual tab follower, because the novel electronic device with the improved friction hinge allows a full 360 degree range of motion with any number of detents at any radial position. Significantly, the user friendly novel electronic device with the improved friction hinge also provides a dependable and inexpensive way to produce a tilt in the display of a qwerty flip device or in a qwerty mode.

The novel electronic device can comprise a friction hinge that pivotally connects a flip to a base. The flip can provide a top and cover of the electronic device. The flip can also comprise a first housing having an inward upper surface, an outward upper surface and an upper edge which connects the inward upper surface and the outward upper surface. At least one of the upper surfaces of the first housing can include a screen which provides an electronic display.

The base can provide a bottom for manually grasping (gripping) the electronic device. The base can also comprise a second housing having an inward lower surface, an outward lower surface and a lower edge which connects the inward lower surface and the outward lower surface. At least one of the lower surface of the second housing can include a keyboard. The base can have a battery compartment which can contain one or more batteries to energize the keyboard and electronic display.

The friction hinge can have a first detent at about a zero (0) degree position for closing the electronic device and a second detent located at a position beyond 180 degrees so that the electronic device can be partially opened and subsequently pivoted to a fully opened position with the flip opened at an angle beyond 180 degrees relative to the base. In the illustrated embodiment, the detents are separated by about 210 degrees to allow for about 190 degrees of travel and about 10 degrees of preload at both ends of travel. In the preferred form, the friction hinge has a spring positioned substantially parallel to an axis of rotation of the electronic device. Preferably, the friction hinge comprises an asymmetric cam with at least two detents. The asymmetrical cam can have a first detent at about a zero (0) degree position and a second detent at a position beyond 180 degrees. The cam can have diametrically opposite curved surfaces and diametrically opposite generally flat planar surfaces. The friction hinge can also include a follower with a single tab for engaging the detents to provide for movement of the electronic device from the closed position, to the partially open position and to the fully open (qwerty) position and vice versa. Desirably, the follower has an axially extending rounded tip providing a single tab for engaging the detents. The follower can have a generally oblong configuration with diametrically opposite curved surfaces and diametrically opposite generally flat planar surfaces.

Significantly, the friction hinge can couple the flip to the base to provide specific positions of the electronic device, such as (1) a closed tablet position in which the flip and base are positioned at about a zero (0) degree angle relative to each other at a closing torque, (2) a fully open qwerty position in which the flip and base are positioned at a open angle beyond about 180 degrees at a fully open torque, and (3) a partially open video player position in which the flip and base are positioned at an open angle ranging between the closed and fully open positions at a torque less than the closing torque and the fully open torque. Preferably, the partially open video player position is greater than zero (0) degrees and less than about 190 degrees and can be achieved at a generally constant (uniform) torque. Most preferably, the partially open video player position ranges from about 70 degrees to about 100 degrees. In the illustrative embodiment, the fully open qwerty position is at about 190 degrees.

The friction hinge can couple the first housing and the second housing about the respective side edges of the first and second housings. In a collapsed orientation, the inward surfaces of the first housing and the second housing can overlay each other and the outward surfaces of the first housing and the second housing can be exposed and face away from each other. In a fully deployed orientation, the display and the keyboard can be in a side by side orientation. In one exemplary embodiment, the hinge coupling is structurally configured to allow for rotation beyond 180 degrees of rotation so that in the fully deployed orientation the display is inclined at an angle of inclination relative to the keyboard. In another embodiment, the electronic device further includes means for retaining the hinge so that the first and second housings are retained in a partially deployed orientation.

The novel electronic device with the improved friction hinge achieves surprisingly good results.

A more detailed explanation of the invention is provided in the following description and appended claims.

DETAILED DESCRIPTION OF THE INVENTION

The following is a detailed description of the preferred embodiments and best modes for practicing the invention.

While this invention is susceptible of embodiment in many different forms, there is shown in the drawings and described herein in detail specific embodiments with the understanding that the present disclosure is to be considered as an exemplification and is not intended to be limited to the illustrated embodiments.

It will be understood that like, similar or analogous parts, structural elements and/or components, referred to herein, may be identified throughout the drawings by like reference characters. Furthermore, it will be understood that the drawings are merely schematic representations of the invention, and some of the parts and components may have been distorted from actual scale for purposes of pictorial clarity.

Referring to the drawings, a light weight, portable, user-friendly electronic device 100 is provided with an improved friction hinge 102 (friction hinge assembly) (FIGS. 2, 5, 7 and 8) which is sturdy, reliable, and effective. The friction hinge can be made of metal and/or plastic. The friction hinge pivotally connects and couples the flip 104 to the base 106 of the electronic device. Advantageously, the friction hinge can allow for a full 360 degree range of motion of the flip 104 relative to the base 106 of the electronic device.

The electronic device can be a wireless device, portable gaming device, mobile communications device, personal digital assistant (PDA), wireless e-mail device, a two way pager, or other hand held electronic device and is preferably an electronic device with a clamshell configuration, a radiotelephone, a cellular (cell) phone, a mobile phone, smartphone, or qwerty flip device or a combination of the preceding.

Figure 1:
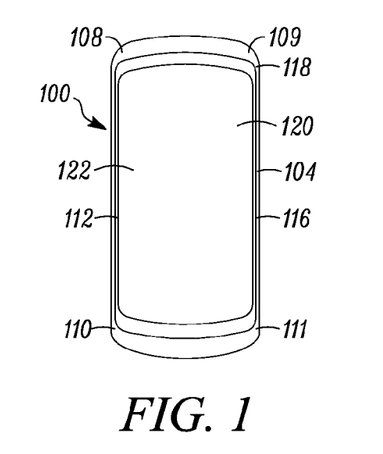
FIG. 1 is a perspective view of an electronic device in accordance with principle of the present invention of the present disclosure shown in a closed position in a tablet mode in which the flip and base are positioned at a zero (0) degree angle relative to each other.

The flip 104 (FIGS. 1 and 2) can provide a top and cover of the electronic device. The flip can be generally rectangular with rounded corners 108-111. The flip can comprise an upper first housing 112 (first housing element) (FIG. 7) having an inward upper surface 114, an outward upper surface 116 (FIG. 1) and an upper generally rectangular peripheral side edge 118 which provides an upper periphery that connects the inward upper surface and the outward upper surface. The outward upper surface of the upper first housing can include an outer display screen 120 (FIG. 1) which can provide an outer electronic display 122. The inward upper surface of the upper first housing can include an inner display screen 124 (FIG. 7) which can provide an inner electronic display 126.

The base 106 (FIG. 7) of the electronic device can provide a bottom for manually grasping (gripping) the electronic device. The base can be generally rectangular with rounded corners 128-131. The base can comprise a lower second housing (second housing element) 132 having an inward lower surface 134, an outward lower surface 136 and a lower generally rectangular peripheral side edge 137 which provides a lower periphery that connects the inward lower surface and the outward lower surface. The inward lower surface of lower second housing element can include a keyboard 138 with alpha numeric keys 140. The base can provide an access panel 142 for accessing a battery compartment 146. The access panel can comprise a door and/or be slidable, pivotable or removable. The battery compartment can contain, house and receive one or more batteries to energize and active the keyboard and electronic displays.

The friction hinge can comprise a pivotable asymmetrical cam 148 (FIGS. 3, 6, and 9) and a follower 150 mounted on a pivotable or rotatable shaft 152 that provides a pivot pin and an axis of rotation. A coil spring 154, such as a compression spring, can be positioned about the shaft to urge and bias the face of the cam against the single tab of the follower.

Figure 2:
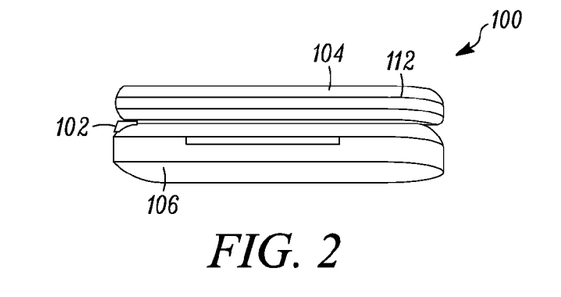
FIG. 2 is a side view of the electronic device shown in the closed position in the tablet mode.
Figure 5:
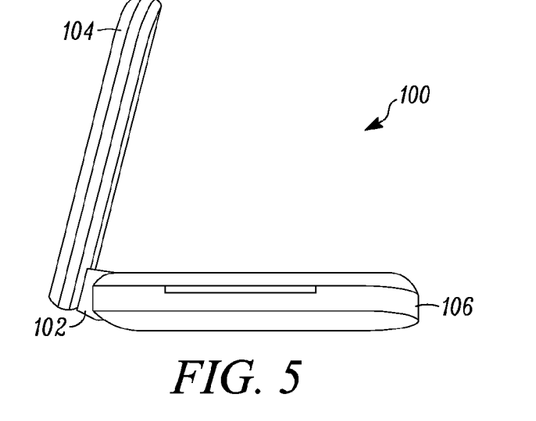
FIG. 5 is a side view of an electronic device shown in the partially open position in the video player mode.
Figure 8:
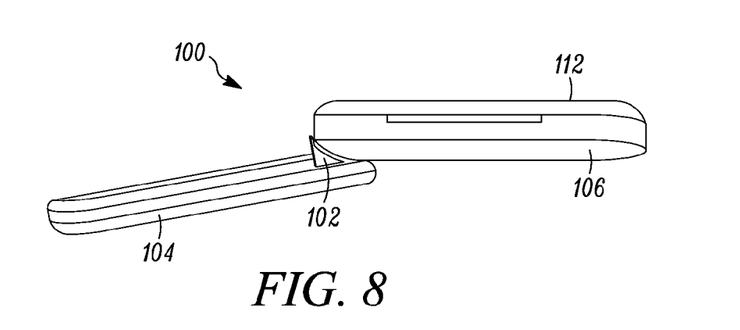
FIG. 8 is a side view of an electronic device shown in the fully open position in the qwerty mode.
Figure 10:
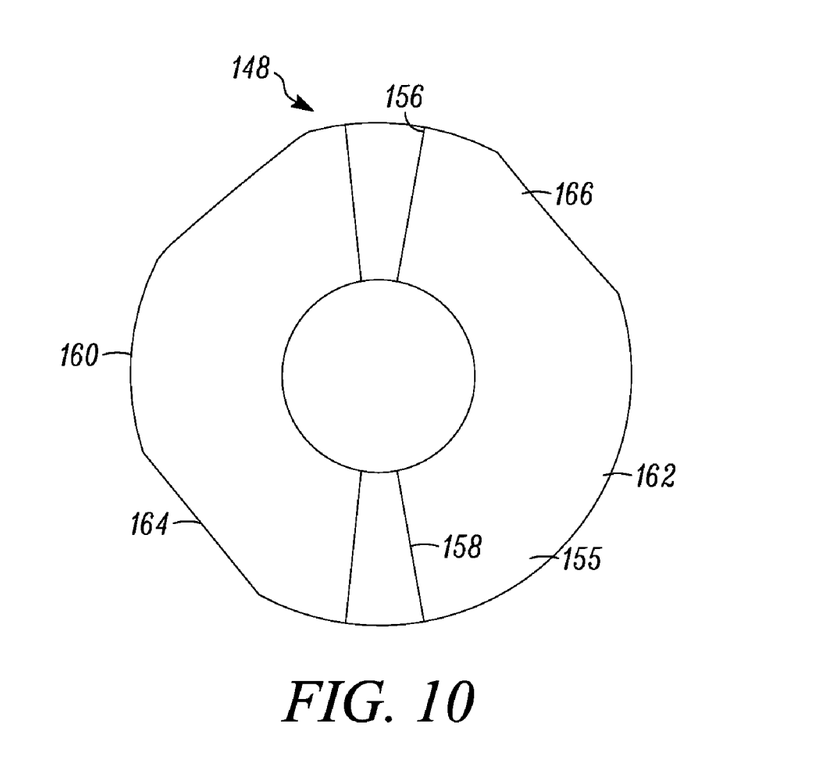
FIG. 10 is an enlarged front view of the asymmetrical cam.
Figure 11:
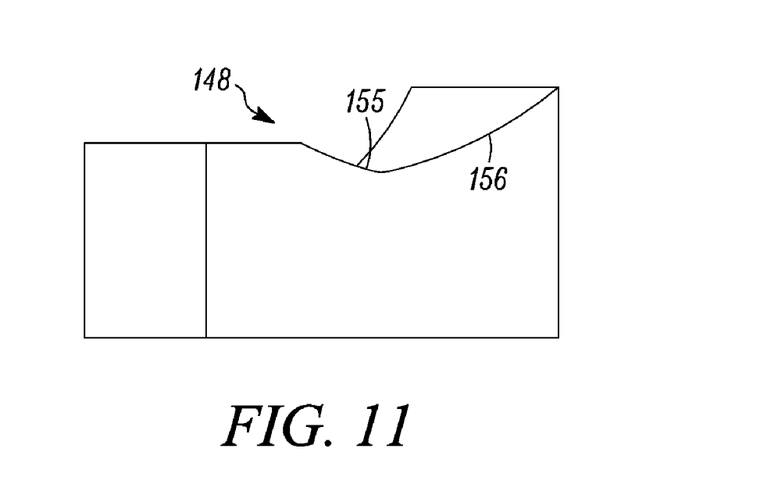
FIG. 11 is an enlarged side view of the asymmetrical cam.

The asymmetric cam 148 (FIGS. 10 and 11) can have a cam face which provides an asymmetrical cam surface 155 upon which the follower rides. The asymmetrical cam surface can have two or more detents 156 and 158 including, but not limited to, a first detent 156 at a zero (0) degree position for closing the electronic device as shown in FIG. 2, and a second detent 158 (FIG. 10) at a position beyond 180 degrees so that the electronic device can be partially opened as shown in FIG. 5 and subsequently pivoted to a fully opened position as shown in FIG. 8 with the flip opened at an angle beyond 180 degrees relative to the base. In the illustrated embodiment, the detents 156 and 158 of the asymmetrical cam are separated by 210 degrees to allow for 190 degrees of travel and 10 degrees of preload at both ends of travel. In some circumstances, it may be desirable that the cam has more than two detents. As shown in FIG. 10, the asymmetrical cam can have diametrically opposite curved surfaces 160 and 162 diametrically opposite generally flat planar surfaces 164 and 166.

Figure 12:
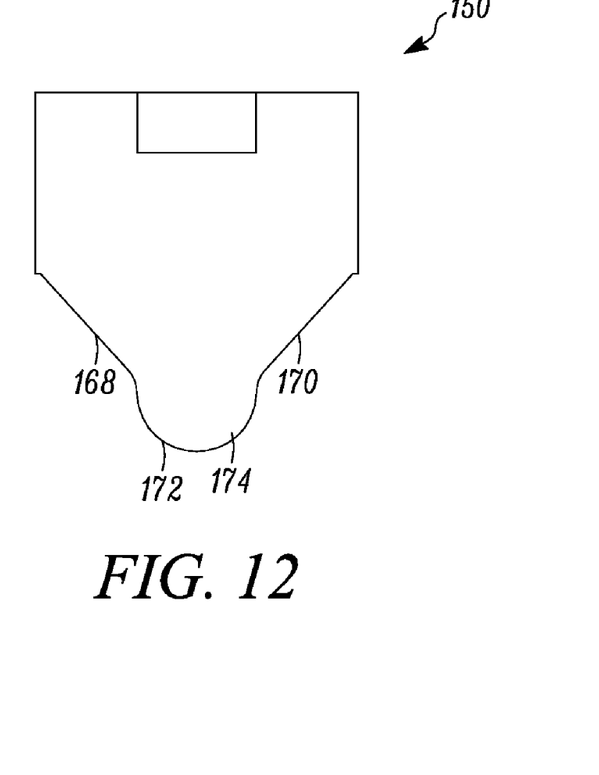
FIG. 12 is an enlarged front view of the follower.
Figure 13:
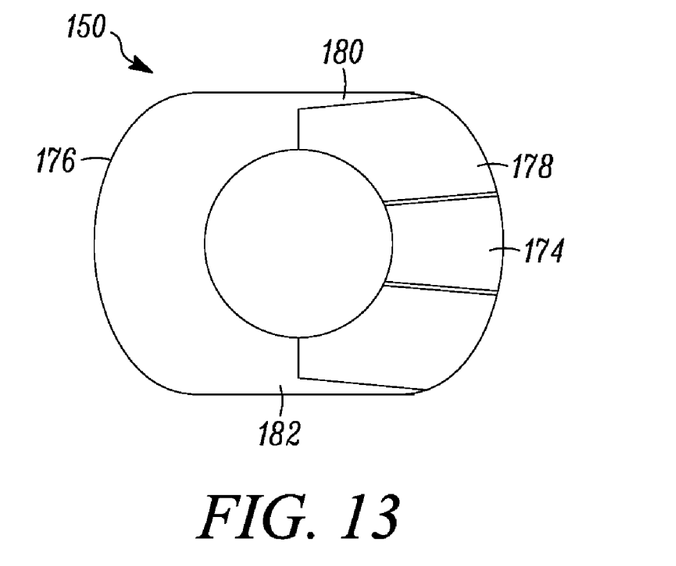
FIG. 13 is an enlarged side view of the follower.

The follower 150 (FIG. 12) can have slanted sides 168 and 170 converging toward and integrally connected to an axially extending rounded tip 172 which provides a single tab 174 for riding and engaging the asymmetrical cam surface and the detents of the asymmetrical cam. In some circumstances, it may be desirable that the tip be pointed or that the follower has more than one tab. As shown in FIG. 13, the follower can have an oblong configuration with diametrically opposite curved surfaces 176 and 178 and diametrically opposite generally flat planar surfaces 180 and 182.

Figure 3:
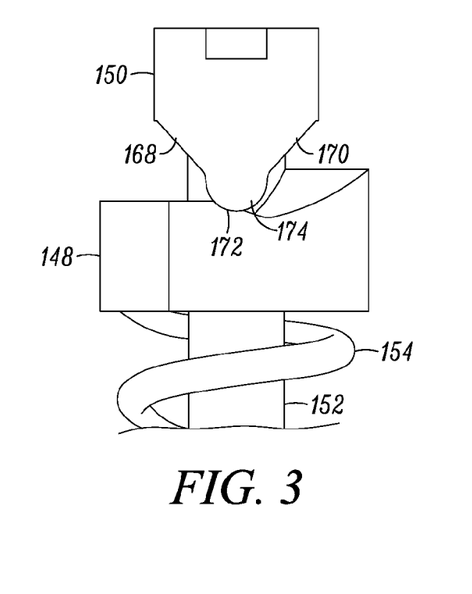
FIG. 3 is an enlarged axial view of the asymmetrical cam, follower and spring when the electronic device is in the closed position in the tablet mode.
Figure 6:
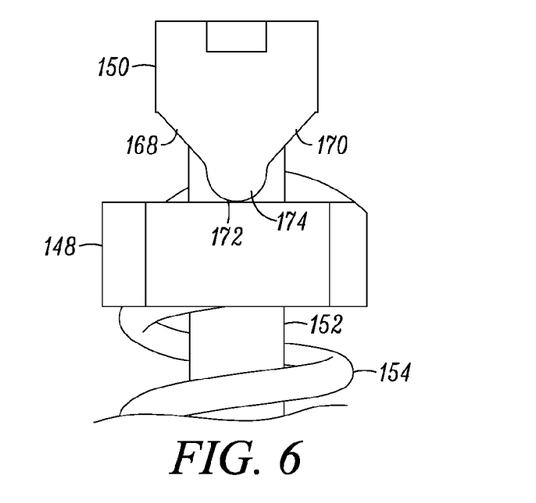
FIG. 6 is an enlarged axial view of the asymmetrical cam, follower and spring when the electronic device is in the partially open position in the video player mode.
Figure 7:
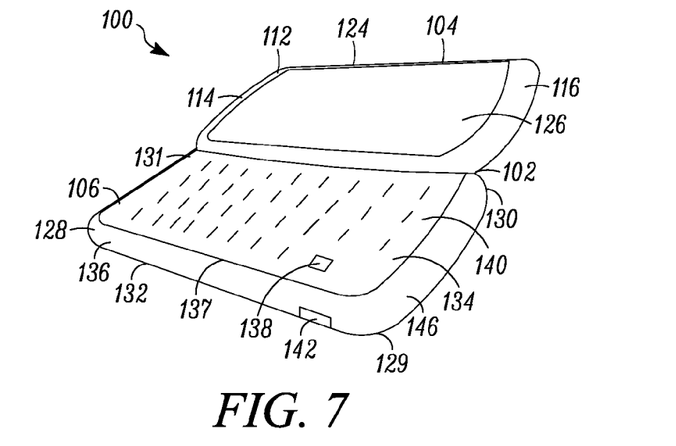
FIG. 7 is a perspective view of an electronic device in shown in a fully open position in a qwerty mode.
Figure 9:
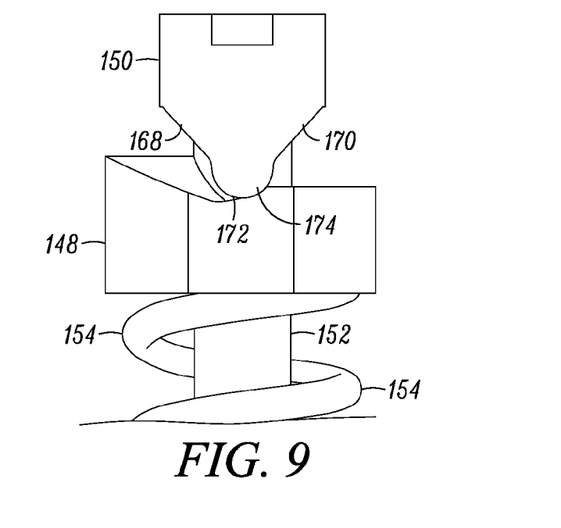
FIG. 9 is an enlarged axial view of the asymmetrical cam, follower and spring when the electronic device is in the fully open position in the qwerty mode.

The coil spring 154 (FIGS. 3, 6, and 9, can be positioned about the shaft (pivot pin) so as to extend in a direction substantially parallel to an axis of rotation of the friction hinge of the electronic device. The coil spring biases and urges the cam against the follower and biases and urges the single tab of the follower against the detents and cam surface.

Advantageously, the friction hinge provides specific positions of the electronic device including: (1) a closed position in a tablet mode as shown in FIG. 2 in which the flip and base are positioned at a zero (0) degree angle relative to each other at a closing torque, (2) a fully open position in a qwerty mode as shown in FIG. 8 in which the flip and base are positioned at a open angle substantially greater than about 180 degrees at a fully open qwerty torque, and (3) a partially open position in a video player mode as shown in FIG. 5 in which the flip and base are positioned at an open angle substantially greater than the closed position but substantially less than fully open position at a torque less than the closing torque and the fully open qwerty torque.

In the preferred embodiment, the partially open position in the video player mode ranges from 70 degrees to 100 degrees and the fully open position is 190 degrees in the qwerty mode.

In operation and use, in the tablet mode of FIG. 2, the flip is held closed using the first detent in the cam and the preload of the coil spring. In the closed position in the table mode, the interior inwardly facing inward surfaces of the flip and base abut and face each other so as to be hidden from view in the interior of the electronic device and are not accessible to the user. In the closed position in the tablet mode, the exterior outer surfaces of the flip and base are visible and accessible to the user.

Figure 4:
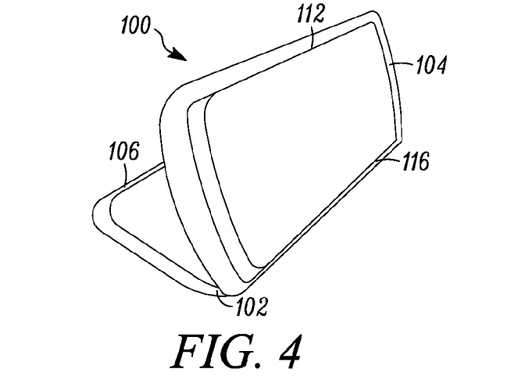
FIG. 4 is a perspective view of the electronic device shown in a partially open position in a video player mode.

In the video player mode as shown in FIG. 4, the user sets of the desired angle of the flip and the flip is then held open with a holding torque produced by the friction between the asymmetrical cam and the follower. In the partially open, video player mode, the user sets the desired angle of the flip to access the inward surfaces of the flip and base.

In the qwerty mode, the flip is held open to 190 degrees using the second detent in the asymmetrical cam and the preload of the coil spring. In the fully open, qwerty mode, the user can readily and fully access the keyboard, keypad or touch screen of the base while having full access and view of the inwardly facing screen of the flip.

In the closed position, in the tablet mode, the electronic device is in a collapsed configuration with the flip and base in an overlying orientation relative to each other. When opened to the qwerty mode in a fully deployed orientation, the flip and base pivot (rotate) relative to a predetermined degree of inclination that preferably exceeds 180 degrees.

The upper outward surface of the upper first housing of the flip can include an electronic display, microphone, speaker and buttons. The electronic display can comprise an LCD display, OLED display, and/or touch screen. The microphone can be positioned at one end of the flip, or on an edge itself. The speaker can be positioned on the opposing end of flip opposite the microphone. Buttons can be provided on the outward surface, such as start call and end call buttons.

The base can include a battery access panel (door) for access into the battery compartment to remove or replace the battery. In some circumstance, the battery compartment case can be sealed and user access to the battery can be limited or fully precluded.

The upper inner surface of the lower second housing of the base can include a speaker. The keyboard on the base can comprises a membrane type keyboard (keypad) with a backlit alpha-numeric display. The keys of the keypad can be colored. The keyboard can also comprise a touch screen display.

The friction hinge can extend entirely across the electronic device. In some circumstance, it may be advantageous that the friction hinge comprise a plurality of discrete friction hinges that extend along the axis of rotation of the electronic device. The friction hinge is configured to allow for rotation in excess of 180 degrees. As such, the outward surface of the flip is angled relative to the base. Such a configuration allows for an improved view of the electronic display while typing on the keyboard or touching or navigating on the touch screen When the user desires to utilize the keyboard in the base, the user can rotate the flip and/or base relative each other. In the fully open position and fully deployed orientation in the qwerty mode, the flip is rotated beyond 180 degrees with the electronic display tilted relative to the keyboard, so that the user can utilize the keyboard while viewing the screen. Generally, rotation of the tilt beyond 180 degrees can be accomplished in the qwerty mode, so that the keyboard is tilted relative to the electronic display to provide optimal positioning of the electronic display relative to the keyboard.

The electronic device is held and maintained in the desired tablet mode, video player mode, or qwerty mode, as selected by the user, by the detents of the cam and tab of the follower. To move the flip to another position, the user exerts sufficient force and torque on the flip to pivot the flip to another position. Accordingly, the detents of the cam and tab of the follower are positioned in such an orientation that they couple against each other to releasably preclude further pivoting (rotation) of flip relative to the base without an increased input force and torque by the user.

Desirably, the improved frictional hinge allows the flip and/or base to be moved to multiple positions in the video player mode, and when desired, the flip and/or base can be pivoted to any position through 360 degrees. In the electronic device, the flip can be pivoted to enhance the viewability of the screen and accessibility of the keypad.

Among the many advantages of the electronic devices with improved friction hinges are:
1. Superior capability.
2. Superb performance.
3. Enhanced range of motion of the flip relative to the base.
4. Excellent ability to move the flip and base to a tablet mode, video player mode and qwerty mode.
5. A better friction hinge.
6. Outstanding ability to move the flip and/or base to any radial position.
7. Reliable.
8. Fewer components.
9. Light weight.
10. Portable.
11. User friendly.
12. Easy to use.
13. Durable.
14. Economical.
15. Attractive.

16. Efficient.

17. Effective.

Although embodiments of the invention have been shown and described, it is to be understood that various modifications, substitutions, and rearrangements of parts, components, and/or process (method) steps, as well as other uses of the electronic device, can be made by those skilled in the art without departing from the novel spirit and scope of this invention. The preceding description merely explains and illustrates the invention and the invention is not limited thereto except insofar as the appended claims are so limited.

What is claimed is:

1. An electronic device, comprising:
   a mobile communications device comprising
      a flip providing a top and cover of said mobile communications device, said flip comprising a first housing having an inward upper surface including a first screen comprising an inner display screen providing an inner electronic display, an outward upper surface and an upper edge connecting the inward upper surface and the outward upper surface, the outward upper surface of the first housing including a second screen comprising an outer display screen providing an outer electronic display;
      a base providing a bottom for manually grasping said mobile communications device, said base comprising a second housing having an inward lower surface, an outward lower surface and a lower edge connecting the inward lower surface and the outward lower surface, the inward lower surface of the second housing including a keyboard providing a keypad, said base defining a battery compartment for receiving at least one battery to energize said keyboard and said electronic displays, and said base having an access panel for accessing said battery compartment;
      a friction hinge pivotally connecting the flip to the base, said friction hinge having a first detent located at about a zero (0) degree position for closing said mobile communications device to a closed position and a second detent located at a position beyond 180 degrees so that said mobile communications device can be partially opened and subsequently pivoted to a fully opened position with the flip opened at an angle beyond 180 degrees relative to the base;
      said second screen comprising said outer display screen providing said outer electronic display being viewable and exposed to the user when said mobile communications device is in said closed position;
      said first screen comprising said inner display screen providing said inner electronic display being hidden from view and not accessible to the user when said mobile communications device is in the closed position;
      said first screen comprising said inner display screen providing said inner electronic display being viewable to the user when said mobile communications device is in the fully opened position; and
      said keyboard comprising said keypad being viewable and accessible to the user when said mobile communications device is in at least one of said positions.

2. The electronic device of claim 1 wherein said mobile communications device is selected from the group consisting of a radiotelephone, a cellular phone, a mobile phone, a smartphone, and combinations thereof.

3. The electronic device of claim 1 wherein said friction hinge comprises:

a spring positioned substantially parallel to an axis of rotation of said mobile communications device;

an asymmetric cam with an asymmetrical cam surface having at least two of said detents; and a follower with an axially extending tip providing a single tab for riding and engaging said detents to provide for movement of said mobile communications device from said closed position, to said partially open position and to said fully open position, and said follower having slanted sides converging toward and integrally connected to said axially extending tip.

4. The electronic device of claim 1 wherein said detents are separated by about 210 degrees to allow for about 190 degrees of travel and about 10 degrees of preload at both ends of travel.

5. An electronic device, comprising:
   a mobile communications device comprising
      a flip providing a top and cover of said mobile communications device, said flip comprising a first housing having an inward upper surface including a first screen comprising an inner display screen providing an inner electronic display, an outward upper surface and an upper edge connecting the inward upper surface and the outward upper surface, the outward upper surface of the first housing including a second screen comprising an outer display screen providing an outer electronic display;
      a base providing a bottom for manually grasping said mobile communications device, said base comprising a second housing having an inward lower surface, an outward lower surface and a lower edge connecting the inward lower surface and the outward lower surface, said inward lower surface of second housing including a keyboard providing a keypad, said base having a battery compartment for containing at least one battery to energize the keyboard and said mobile communications device, and said base having an access panel for accessing said battery compartment;
      a friction hinge coupling the flip to the base for providing specific positions of said mobile communications device including a closed tablet position in which the flip and base are positioned at about a zero (0) degree angle relative to each other at a closing torque, a fully open qwerty position in which the flip and base are positioned at a open angle beyond about 180 degrees at a fully open torque, and a partially open video player position in which the flip and base are positioned at an open angle of inclination ranging between said closed and fully open positions at a torque less than said closing torque and said fully open torque;
      said second screen comprising said outer display providing said outer display being viewable and exposed to the user when said mobile communications device is in said closed tablet position;
      said first screen comprising said inner display screen providing said inner electronic display being hidden from view and not accessible to the user when said mobile communications device is in the closed tablet position;
      said first screen comprising said inner display screen providing said inner electronic display being viewable to the user when said mobile communications device is in the fully open qwerty position; and
      said keyboard comprising said keypad being viewable and accessible to the user when said mobile communications device is in at least one of said positions.

6. The electronic device of claim 5 wherein said partially open video player position is at an angle of inclination greater than zero (0) degrees and less than about 190 degrees at a generally constant torque.

7. The electronic device of claim 5 wherein said partially open video player position ranges from about 70 degrees to about 100 degrees.

8. The electronic device of claim 5 wherein the fully open qwerty position is at about 190 degrees.

9. The electronic device of claim 5 wherein the friction hinge comprises an asymmetrical cam with a first detent at about a zero (0) degree position and a second detent at a position beyond 180 degrees.

10. An electronic device, comprising:
a mobile communications device comprising
a flip providing a top and cover of said mobile communications device, said flip comprising a first housing having an inward upper surface including a first screen comprising an inner display screen providing an inner electronic display, an outward upper surface and an upper edge connecting the inward upper surface and the outward upper surface, and said outward upper surface of the first housing including a second screen comprising an outer display screen providing an outer electronic display;
a base providing a bottom for manually grasping the said mobile communications device, said base comprising a second housing having an inward lower surface, an outward lower surface and a lower edge connecting the inward lower surface and the outward lower surface, the outward lower surface of second housing including a keyboard providing a keypad, said base having a battery compartment for receiving at least one battery to energize the keyboard and said inner and outer electronic displays;
a friction hinge pivotally connecting and coupling the flip to the base, said friction hinge comprising
a shaft providing a pivot pin and defining an axis of rotation;
an asymmetrical cam having a first detent located at a zero (0) degree position for closing the mobile communications device and a second detent located at a position beyond 180 degrees so that the said mobile communications device can be partially opened and subsequently pivoted to a fully opened position with the flip opened at an angle beyond 180 degrees relative to the base, said asymmetrical cam having a face;
a follower secured to said shaft and having an axially extending rounded tip providing a single tab for riding the asymmetrical cam and engaging the detents;
a coil spring positioned about the shaft and extending axially along and substantially parallel to an axis of rotation of said mobile communications device for urging the face of said asymmetrical cam against the single tab of the follower;
said friction hinge providing specific positions of said mobile communications device including a closed position in a tablet mode in which the flip and base are positioned at a zero (0) degree angle relative to each other at a closing torque, a fully open position in a qwerty mode in which the flip and base are positioned at a open angle substantially greater than about 180 degrees at a fully open torque, and a partially open position in a video player mode in which the flip and base are positioned at an open angle substantially greater than said closed position but substantially less than fully open position at a torque less than said closing torque and said fully open torque;
said second screen comprising said outer display providing said outer electronic display being viewable and exposed to the user when said mobile communications device is in said closed position in said tablet mode;
said first screen comprising said inner display screen providing said inner electronic display being hidden from view and not accessible to the user when said mobile communications device is in said closed position in said tablet mode;
said first screen comprising said inner display screen providing said inner electronic display being viewable to the user when said mobile communications device is in said fully open position in said qwerty mode; and
said first and second screens comprising said inner and outer display screens providing said inner and outer electronic displays and said keyboard comprising said keypad being viewable and accessible to the user when said mobile communications device is in said partially open position in said video player mode.

11. The electronic device of claim 10 wherein:
said mobile communications device is selected from the group consisting of a phone with a clamshell configuration, a radiotelephone, a cellular phone, a mobile phone, a smartphone, and combinations thereof; and
said first screen comprising said inner display screen providing said inner electronic display and said keyboard said keypad are in a side by side orientation in said fully open position in said qwerty mode.

12. The electronic device of claim 10 wherein:
in the tablet mode, the flip is held closed using the first detent in said asymmetrical cam and the preload of the coil spring;
said partially open position in the video player mode ranges from about 70 degrees to about 100 degrees, and when said mobile communications device is in the video player mode, the user sets the desired angle of the flip and the flip is then held open with a holding torque produced by the friction between said asymmetrical cam and the follower;
said fully open position is about 190 degrees, and when the electronic device in is in the qwerty mode, the flip is held open to about 190 degrees using the second detent in the cam and the preload of the coil spring;
said coil spring comprises a compression spring;
said asymmetrical cam comprises an asymmetrical cam surface;
said follower having slanted sides converging towards and integrally connected to said axially extending rounded tip; and
said friction hinge comprises metal, plastic, or combinations thereof.

13. The electronic device of claim 10 wherein said detents of said asymmetrical cam are separated by about 210 degrees to allow for about 190 degrees of travel and about 10 degrees of preload at both ends of travel.

14. The electronic device of claim 10 wherein said friction hinge allows for a full 360 degree range of motion of the flip relative to the base.

15. The electronic device of claim 5 wherein said mobile communications device is selected from the group consisting of a radiotelephone, a cellular phone, a mobile phone, a smartphone, and combinations thereof.

* * * * *